United States Patent [19]
Stier et al.

[11] 3,889,741
[45] June 17, 1975

[54] APPARATUS FOR HARD FACING SAW BLADE TEETH

[75] Inventors: Otto Stier, Biberach an der Riss; Heinz Kuhn, Mettenberg, both of Germany

[73] Assignee: Vollmer Werke Maschinenfabrik GmbH, Germany

[22] Filed: Apr. 26, 1974

[21] Appl. No.: 464,316

[30] Foreign Application Priority Data
Apr. 26, 1973  Germany............................ 2321161

[52] U.S. Cl. .................... 164/332; 76/112; 164/138
[51] Int. Cl. ............................................. B22d 19/06
[58] Field of Search .......... 164/332, 333, 334, 161, 164/162, 163, 91, 92, 93, 286, 288, 106, 107, 108, 109, 105, 98, 99, 138; 425/116, 121

[56] References Cited
UNITED STATES PATENTS

| | | | |
|---|---|---|---|
| 2,250,561 | 7/1941 | Wissler ........................... | 164/103 X |
| 2,688,168 | 9/1954 | Hurt................................ | 164/120 X |
| 3,063,310 | 11/1962 | Connoy................................ | 76/112 |
| 3,674,083 | 7/1972 | Stier................................ | 164/138 X |

*Primary Examiner*—Francis S. Husar
*Assistant Examiner*—John S. Brown
*Attorney, Agent, or Firm*—Hill, Gross, Simpson, Van Santen, Steadman, Chiara & Simpson

[57] ABSTRACT

Saw blades such as endless band saws have the cutting tips of the saw teeth faced with a hard alloy such as Stellite and shaped by half molds straddling the sides of the saw and an end stop member successively aligning the saw teeth with the molds and then also shaping the end face of the tip. The mold sections cooperate to form an open front and open top mold cavity around the tip end of the saw tooth. Molten alloy from a rod is projected into this cavity by a torch flame to form a bead on the saw tooth tip and the stop member then descends to close the front of the mold cavity and cooperate therewith to shape the alloy around the tip in welded relation therewith. Alternately, the alloy can be deposited in the mold cavity in powder form and melted by the torch to be welded and shaped on the saw tooth. The mold components are swingable between open and closed positions and the stop component is raised and lowered from the space between the teeth permitting the saw blade to be advanced after each molding step and serving as an indexing means to stop the advancing saw blade at the next tooth to be tipped. The side mold members can be in the form of blocks with the mold defining cavities in their corners and arranged to be shifted to present fresh mold cavity defining walls to the saw blade in the event of wear or damage of the previously used cavity walls and the stop face of the stop member can be a multi-face block that is rotated to present fresh shaping surfaces.

16 Claims, 8 Drawing Figures

APPARATUS FOR HARD FACING SAW BLADE TEETH

BACKGROUND OF THE INVENTION

1. Field of the Invention

This invention relates to the art of applying hard facing materials such as Stellite to the cutting teeth of a saw blade along an area of the tooth face adjacent to the tip of the tooth and extending around both sides of the tip. Particularly, the invention deals with molding apparatus for receiving the facing material in pulverulent or molten form, which has two opposed refractory mold side parts applicable to each side of the saw blade and a stop part first aligning the saw blade tooth to be tipped with the mold cavity and then shaping the leading edge of the welded-on tip.

2. Prior Art

In Austrian Pat. No. 282,847 issued July 10, 1970 to Vollmer Werke Maschinenfabrik GmbH, the assignee of this application, the disclosure of which is incorporated herein by reference, a device for hard facing of saw blades is disclosed which pushes the saw blade with a feed pawl in a direction opposite the cutting direction between mold side parts. Thus, the feed-in position of the saw tooth was determined by the end position of the feed pawl engaging the face of an adjacent tooth. In such devices, the hard facing material welded on the saw teeth could not be accurately positioned and shaped because any variations in tooth pitch of the saw resulted either in pushing the tooth too far between the mold side parts or not far enough and after closing of the mold side parts, an accurate spatial correlation did not exist between the mold chamber and the tooth received therein. Attempted engagement of the feed pawl directly on the tooth face of the particular tooth to be tipped with the hard facing material created problems of damaging the mold side parts with the feed pawl and delays in closing the mold side parts until after the feed pawl has been retracted.

SUMMARY OF THE INVENTION

The present invention now accurately positions each saw tooth blade in a mold so that hard facing alloys may be welded onto the teeth in the exact desired shape to eliminate heretofore required machining. The invention also greatly reduces the time for hard facing of saw teeth.

In accordance with this invention, a saw such as an endless band saw is advanced in its cutting direction between two swingable side mold components against a swingable stop member which engages the cutting edge of the saw tooth to be hard faced. The mold sides are then closed against the sides of the saw blade to form a mold cavity around the sides of the tip and of the tooth, the stop member is raised, and the hard facing alloy is deposited on the tooth tip either in molten form from a torch heated welding rod or in powder form to be torch heated and welded on the tooth. Then the stop member is lowered to close the front end of the mold cavity thereby shaping the alloy welded on the tooth tip, preferably to a trapezoidal shape. The side mold components are swung away from the sides of the saw blade, the stop member is raised, the blade is advanced, the stop member is lowered into the space between the just tipped tooth and the next succeeding tooth to engage the leading edge of the succeeding tooth and stop the movement of the saw. The operation is then repeated to weld and shape the alloy on the next tooth.

The feeding of the saw blade takes place in the direction of a saw cut and is conveniently accomplished by a pair of rollers riding against the sides of the saw blade. With the utilization of the stop member, each feed step is independent of variations in the pitch of the saw teeth and each tooth receives the hard facing material exactly in its intended position.

The drive for the stop member can be such as to move the member to its tooth stopping position before the end of each feed movement of the saw blade to accurately stop the saw relative to the side mold parts and then the stop is raised so that the side mold parts may assume their closed position whereupon the stop is again dropped into its position to close the mold parts.

Because of the high temperatures involved on introducing molten hard facing alloy into the mold or on melting the alloy in the mold, the mold's side parts and to a lesser degree, the closure part, is subjected to wear and corrosion which after some time, impairs the form and arrangement of the mold cavity. Therefore, to maintain accuracy, the present invention includes the formation of the mold side parts as parts of a prism having the corners cut back to the mold cavity shape and the formation of the stopping and shaping portion of the stop member as a multi-sided prism. These prisms are exchangeable and are carried in a mounting in a number of positions on the mold side members and closure members, respectively so that they can be rotated or switched to present a fresh mold cavity wall or shaping face whenever needed.

The use of prisms to provide the mold cavity walls makes possible the rotatable mounting of regular polygonal base members by a drive travelling synchronously with the mold closure movements so that upon each closure movement, the prism would be rotated to present a fresh mold cavity wall. In this arrangement, the previously used cavity wall defining corners of the prism could be cooled and prepared for the next use as for example, by spraying on a protective film. The drive for the rotary movement of the prisms may be a tooth chain drive or a maltese cross drive. A similar drive could be used for the prism on the stop member.

It is then an object of this invention to improve the accuracy of hard faced saw tooth tips with apparatus that accurately positions each saw tooth for a molding operation regardless of variations in the pitch of the saw teeth.

Another object of this invention is to provide a molding apparatus which will quickly and accurately mold hard facing alloys onto the teeth of saws.

A specific object of the invention is to provide a three component mold arrangement for hard facing saw teeth wherein one of the components acts as a stop member to accurately position each saw tooth for the molding operation.

Another object of the invention is to provide a molding apparatus for saw teeth with swingable side arms carrying side mold components that clamp the sides of a saw and a swingable top part which acts as a stop to accurately position the saw tooth.

Another object of the invention is to provide hard facing molds for saw teeth with quickly changeable mold cavity defining walls.

Other and further objects of this invention will become apparent to those skilled in this art from the fol-

3 lowing detailed description of the annexed sheet of drawings which, by way of an example only, illustrates an embodiment of the invention.

IN THE DRAWINGS

AS SHOWN ON THE DRAWINGS

Figure 1:
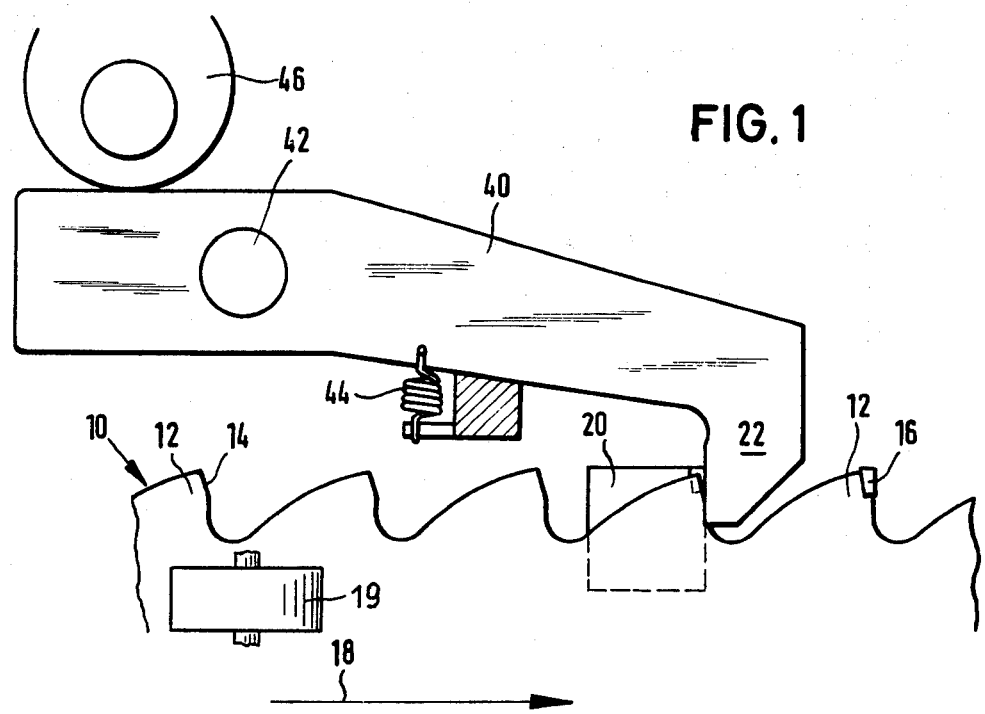
FIG. 1 is a somewhat diagrammatic side elevational view of the apparatus of this invention in a first operating position.

The reference numeral 10 designates an endless band saw blade with saw teeth 12 inclined in the area of its tooth face 14 to be provided, according to this invention, with a hard facing coating 16 of an alloy such as Stellite.

Figure 2:
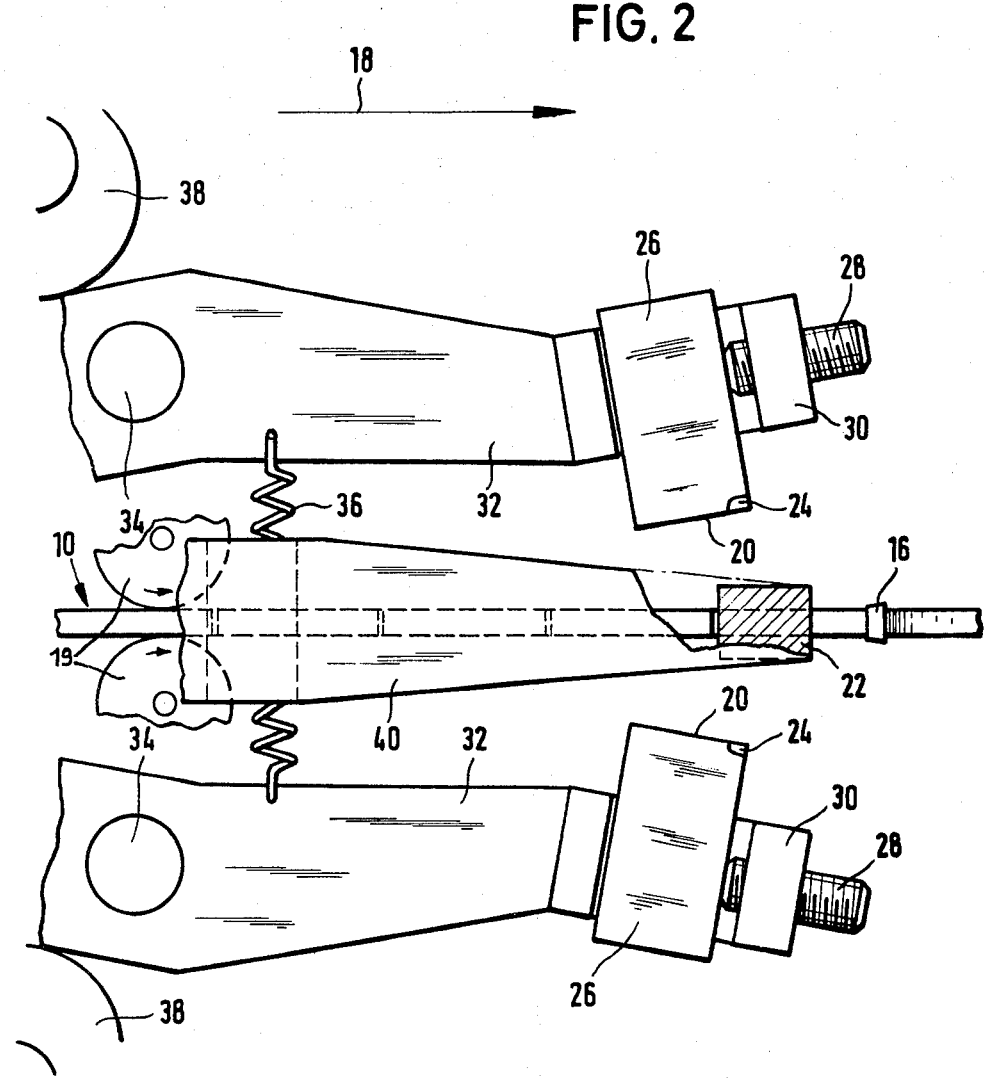
FIG. 2 is a plan view of the apparatus of FIG. 1 showing the side mold components.

As shown in FIG. 2, the hard facing or coating 16 projects beyond the sides of the saw blade 10 and has, in the plan view, the shape of a trapezoid with a large base at the front edge thereof in the direction of the arrow 18 shown in FIG. 1. This coating or hard facing 16, after any desired subsequent sharpening operations, forms the cutting edge of the saw tooth 12.

The molding apparatus of this invention has a base composed of two homogolously similar mold side parts 20 and a closure part 22 arranged symmetrically with reference to the plane of the saw blade 10. Each mold side part 20 constitutes one half 24 of a mold cavity and is part of a prism 26 with a square base that is releasably held with a clamping screw 28 in a mounting 30.

Each of the two mountings 30 is arranged on a side of the saw blade 10 on one end of a double armed lever 32 pivoted on a bearing pin 34 and supported by initial tension of a spring 36 connecting both levers with each other and pivoting them against their respective cam disks 38. The cam disks 38 are rotated during periods when the roller drive 19 for feeding the saw blade 10 in the direction of the arrow is at a standstill.

The closure part 22 is also arranged on one end of the double armed lever 40 pivoted on a stationary bearing pin 42 and pivoted about this pin by a tension spring 44 holding the lever against a cam disk 46 which is rotated to raise the lower the lever.

In FIGS. 1 and 2 the front end of the lever 40 positions the closure part 22 in the space between two adjacent teeth 12 to form a stop member for the tooth face 14 when the saw blade 10 is advanced in the direction of the arrow 18. The front ends of the levers 32 with the mold side parts 20, as shown in FIG. 2, are swung away from each other and from the saw blade during this feed movement of the saw blade against the stop 22.

Figure 3:
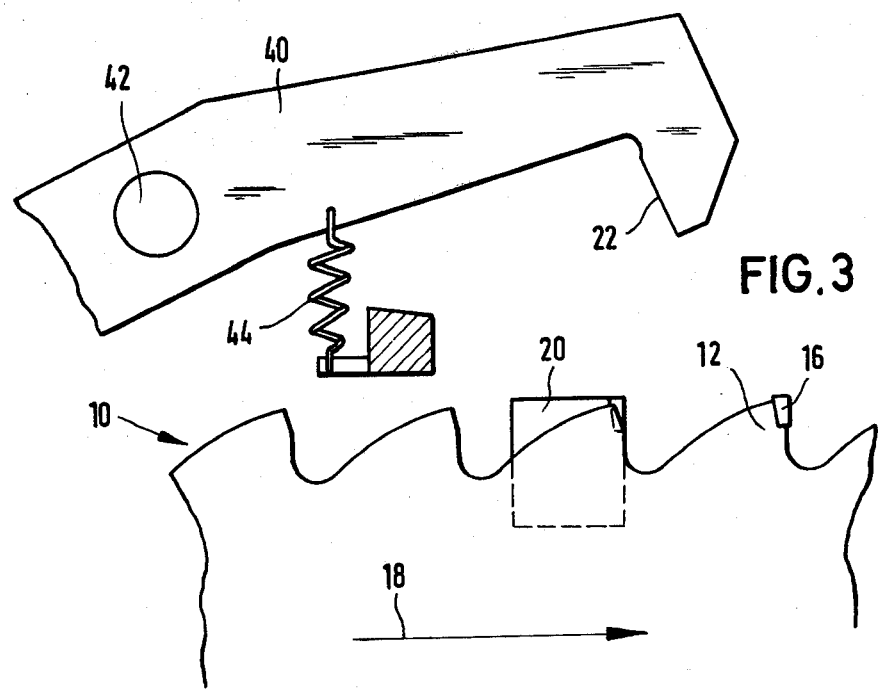
FIG. 3 is a view similar to FIG. 1 but showing a second operating positions.
Figure 4:
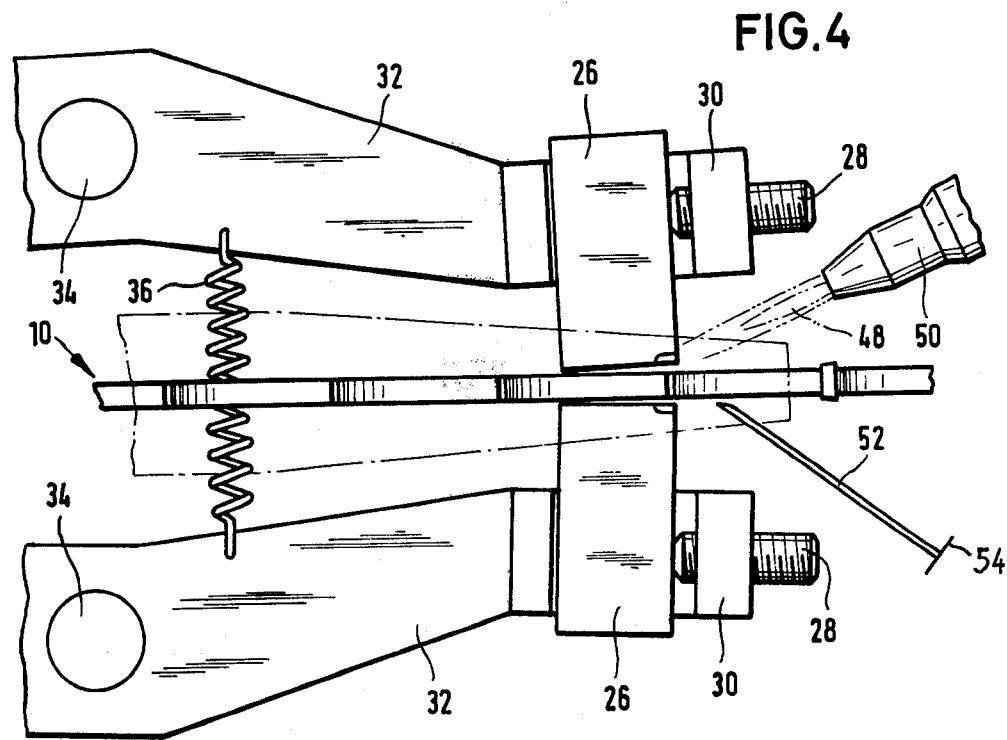
FIG. 4 is a view similar to FIG. 2 but showing a second operation position.
Figure 6:
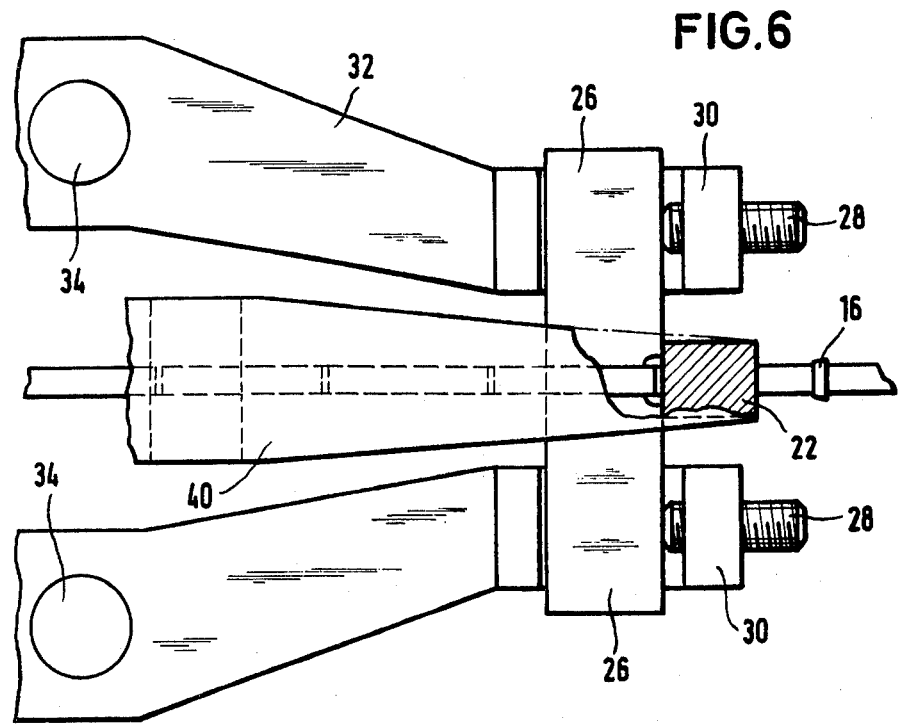
FIG. 6 is a plan view similar to FIG. 2 but illustrating a third operation position.

As soon as the saw blade 10 reaches the stop position shown in FIG. 1 with the saw tooth 12 abutting with its tooth face 14 on the closure part 22, the saw blade is exactly positioned with reference to the mold side parts 20 and the lever 40 is then swung to the upper position of FIG. 3 while at the same time, the side mold parts 30 are moved toward each other from the position of FIG. 2 to the position of FIG. 4. Before the side parts 30 abut the sides of the saw blade 10, as shown in FIG. 4, the flame 48 of a gas burner 50 is directed against the saw tooth 12 between the mold side parts 20 so that this saw tooth 12 will be heated. At the same time, a Stellite rod 52 is conveyed by an automatic feed device 54 into the flame 48. Before a drop is melted off of the tip of the Stellite rod 52, the mold parts 20 will be moved into their fully closed position as shown in FIG. 6. Then molten alloy from the rod 52 is projected by the pressure of the flame 48 into the mold cavity formed by the mold side parts on both sides of the tip of the tooth and into the area of the tooth adjacent to the tip. The drop, due to cohesive forces assumes a spherical shape on its free surface.

In order to prevent the Stellite drop remaining in a spherical shape in the area of a tooth face after it solidifies, the closure part 22, as shown in FIGS. 5 and 6, is again swung downwardly to abut not only the tooth face 14 but also to abut the sides of the mold parts 20 in such a manner that the mold cavity is closed at least at its front side which is the tooth face side in the direction of the arrow 18.

Figure 5:
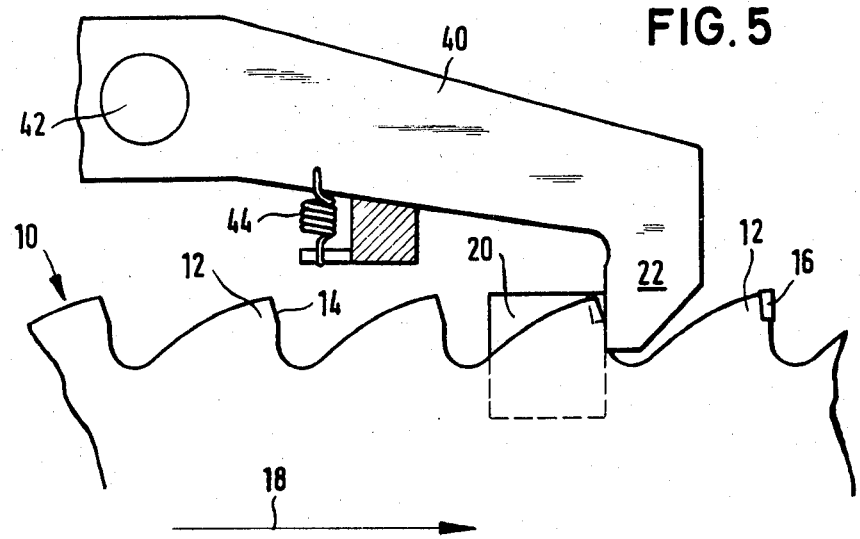
FIG. 5 is a side elevational view similar to FIG. 1 but illustrating a third operating position.

If desired, the closure part may be formed in such a manner that it closes the mold cavity on top as well as on the front side as indicated in FIG. 5 in dotted lines.

Figure 7:
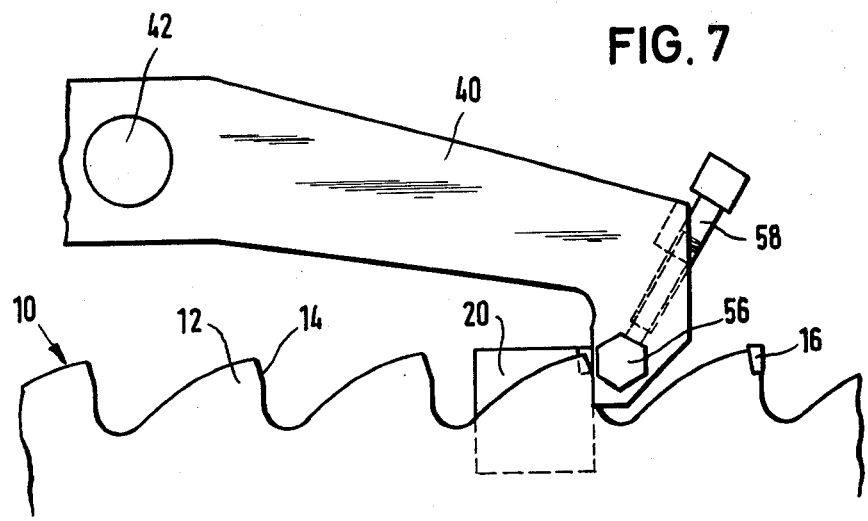
FIG. 7 is a side elevational view similar to FIG. 1 but illustrating a modified detail.

If desired, a prism 56 may be carried by the front end of the lever 40 as shown in FIG. 7 to form the active stop member. As shown, a hexagonal prism provides six closure parts 22 which are mutually exchangeable so that when the prism 46 is rotated after being released from a clamping screw 58, a new closure part face may be provided. The rotation of the prism 56 can take place automatically by mounting the prism rotatably on the front end of the lever 40 and connecting it with a driving device such as a gear belt drive which may travel over rollers positioned on the bearing pin 42.

Figure 8:
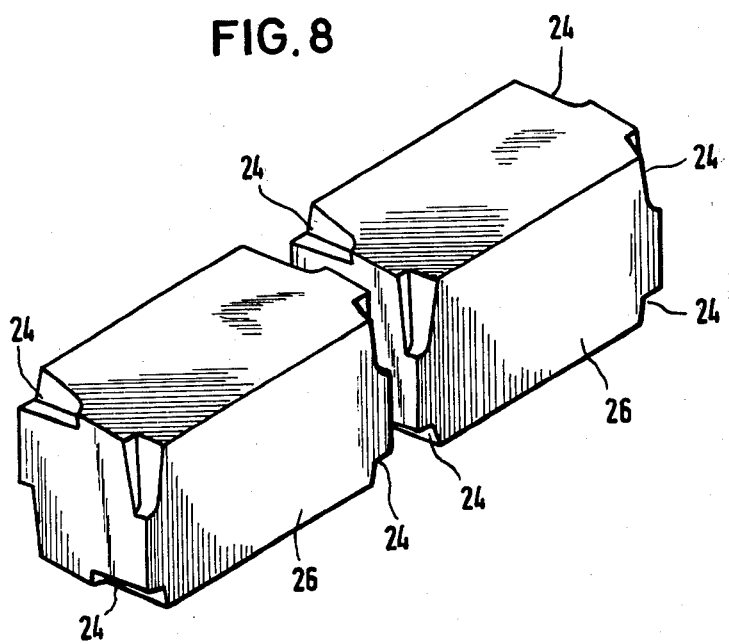
FIG. 8 is a perspective view of prism components for the side molds.

In FIG. 8, two prisms 26 for the side mold parts are shown in an enlarged scale with each of their corners forming one half 24 of the mold cavity. Each of these prisms 26 thus provides eight mold side parts 20. The prisms, after each operative cycle, can be rotated automatically by means of a drive of the type decribed above for the prism 56. The non-active cavities can be cooled and coated between their active positions.

From the above description, therefore, it will be understood that this invention makes possible the application of hard facing alloys to the tip ends of saw blade teeth in a manner that insures accurate molding of the alloy to a shape so closely approximating the finished sharpened tooth that little or no machining after the molding step is needed.

We claim as our invention:

1. An apparatus for the application of a hard facing alloy to the teeth of saw blades which comprises a pair of side mold members arranged to straddle the sides of a saw blade, a movable stop member spearate from said side mold members arranged to successively engage the leading edges of saw teeth to aligh each successive tooth with the side mold members and to shape the leading edge of hard facing material deposited on the tooth, means for shifting the side mold members between open positions away from the saw blade and into closed positions forming mold cavities on opposite sides of a saw tooth to be hard faced, and said stop member having a shaping surface selectively closing the front ends of the mold cavities to cooperate therewith for shaping an alloy deposited on the tooth.

2. An apparatus for applying hard facing alloy to the cutting edges of saw teeth which comprises a pair of mold members arranged to straddle the sides of a saw blade and form a mold cavity around the tip of a saw tooth, a stop member movable into and out of the space between adjacent saw teeth in front of the mold members for engaging the leading edge of a saw tooth to align the tooth with the mold members and having a surface cooperating with the mold members to shape the leading edge of a hard facing tip end on a saw blade tooth, and means for alternately moving the stop member away from the saw blade tooth after the tooth is aligned with the molds to open the mold cavity for receiving hard facing alloy and for then moving back into the space between the saw blade teeth for shaping the leading edge of the alloy in the mold.

3. An apparatus for applying hard facing alloy to the tip ends of saw blade teeth which comprises opposed swingable mold members adapted to straddle a saw blade and swingable from an open position spaced from the saw blade to a closed position providing mold cavities on opposite sides of the leading edge of a saw blade tooth, a swingable stop member movable from an open position spaced from a saw blade straddled by the pair of mold members to a position engaging the leading edge of a saw tooth for stopping the tooth in alignment with the cavities of mold members, and said stop member having a surface cooperating with the mold members to shape the hard facing alloy applied to the saw tooth.

4. The apparatus of claim 1 wherein the mold members have removable prisms with mold defining cavities in the corners thereof adapted to be shifted for presenting fresh cavity areas to receive the hard facing alloy.

5. The apparatus of claim 1 wherein the stop member carries a multi-sided member adapted to the shifted to present new side faces to form the shaping surface.

6. The apparatus of claim 1 including means for advancing a saw blade in the direction of cut against the stop member.

7. The apparatus of claim 1 including means on the stop member also closing the top of the mold cavities.

8. The apparatus of claim 2 wherein the means for alternately moving the stop member includes a cam.

9. The apparatus of claim 2 wherein the mold members are mounted on swingable arms and are pulled to closed position by spring-means.

10. The apparatus of claim 3 including cam and spring means for swinging the mold and stop members.

11. The apparatus of claim 3 wherein the stop member engages the leading edge of the tooth to be hard faced and is spaced from the tip end of the tooth.

12. The apparatus of claim 3 including a torch propelling a heating flame against the mold member and tooth therein.

13. The apparatus of claim 12 including means to feed alloy into the heating flame.

14. The apparatus of claim 3 including means driving the saw blade against the stop member.

15. The apparatus of claim 4 wherein the prisms are automatically rotated.

16. The apparatus of claim 5 wherein the multi-sided stop member is automatically rotated.

* * * * *